United States Patent

Eversdyk

[11] Patent Number: 5,203,279
[45] Date of Patent: Apr. 20, 1993

[54] PUPPY TRAINING DEVICE

[76] Inventor: Martin Eversdyk, 29150 Harvard Rd., Cleveland, Ohio 44122

[21] Appl. No.: 807,962

[22] Filed: Dec. 11, 1991

Related U.S. Application Data

[63] Continuation of Ser. No. 637,292, Jan. 3, 1991, abandoned.

[51] Int. Cl.⁵ ............................................. A01K 15/00
[52] U.S. Cl. ........................................ 119/29; 482/146
[58] Field of Search ................... 119/29, 174; 272/54, 272/55, 56, 114, 146, 440, 449; D21/66, 102, 193

[56] References Cited

U.S. PATENT DOCUMENTS

| | | | |
|---|---|---|---|
| D. 134,341 | 11/1942 | Churchill | D21/66 |
| 583,661 | 6/1897 | Smith | 119/29 |
| 2,506,322 | 5/1950 | Yushak | 119/29 |
| 2,803,461 | 8/1954 | Coplin | 272/56 X |
| 2,833,244 | 5/1958 | Bohlman | 119/29 |
| 3,352,559 | 11/1967 | Larsen | 272/146 X |
| 3,612,520 | 10/1971 | Chang | 272/146 X |
| 3,967,820 | 7/1976 | Harper | 272/114 |
| 4,289,306 | 9/1981 | Thomas | 272/33 R |
| 4,601,469 | 7/1986 | Sasser, Jr. | 272/146 |
| 4,817,950 | 4/1989 | Goo | 273/148 B |

FOREIGN PATENT DOCUMENTS

| | | | |
|---|---|---|---|
| 620896 | 5/1961 | Canada | 272/114 |
| 3620706 | 12/1987 | Fed. Rep. of Germany | 272/146 |
| 7901529 | 8/1980 | Netherlands | 272/146 |

Primary Examiner—Gene Mancene
Assistant Examiner—Todd Manahan
Attorney, Agent, or Firm—Watts, Hoffmann, Fisher & Heinke Co.

[57] ABSTRACT

An apparatus and method for developing and improving the general character, ability and trainability of a young dog between the ages of three to twelve weeks. The apparatus comprising a deck securely attached atop a base having rocking members. When at rest, the distance between the deck top surface 11 and the ground is such that a young puppy or litter of puppies, aged three weeks, can climb upon the deck top surface to playfully romp and play king-of-the hill type games with his litter mates as the deck 10 rocks and rotates.

7 Claims, 2 Drawing Sheets

PUPPY TRAINING DEVICE

This is a continuation of co-pending application Ser. No. 07/637,292 filed on Jan. 3, 1991, now abandoned.

FIELD OF THE INVENTION

The present invention relates to devices used to train dogs. More specifically, the present invention relates to an apparatus and method for improving the intelligence, disposition, agility, balance and coordination of a litter of puppies.

BACKGROUND ART

Breeding and training dogs is an occupation requiring special knowledge and expertise. Great amounts of time, effort and money are spent each year in raising high quality, productive dogs for home, show and work. Working dogs include Police and Seeing Eye dogs for the handicapped.

Traditionally, placement of puppies depends on the genetic make-up, personality, intelligence and abilities of each individual puppy. This is especially true of show and work dogs. However, it is difficult to ascertain the level of skill and intelligence possessed by a puppy when it is weaned from the litter.

Normally, when a litter is born, the puppies remain with the mother until they are seven to eight weeks old. During this time, puppies receive little or no training. Meanwhile, as the puppies grow and develop, valuable training time is lost. As a result, when formal training is instituted after the seventh week, puppies learn more slowly and higher training costs are incurred. To date, breeders and trainers have absorbed this lost time. The present apparatus and method begins to develop such critical traits as: personality, disposition, agility and balance as early as the third week of a puppy's life, reducing the time and expense of training.

SUMMARY OF THE INVENTION

The present invention involves an apparatus and method for developing desirable physical and character traits in a litter of puppies, such as confidence, agility, balance, coordination and disposition throughout the critical stages of development experienced by each individual puppy's.

Critical stages of animal development are well recognized by dog trainers throughout the world. With respect to puppies, five critical stages have been identified.

The first critical stage occurs during the first twenty days of a puppy's life. During this period, a puppy's most critical function is survival. A puppy's vital requirements for survival are warmth, food, sleep, massaging and its mother. The mother should be present at all times to provide warmth, food and massaging. Massaging is the frequent licking of a puppy by the mother. It enables a puppy to eliminate waste matter, a function normally not present during the first few weeks of a puppy's life. During the first critical stage individual puppies experience little mental development.

The second critical stage, the fourth week, is considered to be the most critical phase of a puppy's emotional development. On the twenty-first day of life, a puppy's senses begin to function. Each puppy begins to hear, see, and smell. From this stage forward, the litter's physical environment helps to shape character traits. Although puppy trainability is slight during this critical stage, the training apparatus is placed upon a hard, flat surface within the puppy's environment to begin the training and development of each puppy within a litter.

With the disclosed and presently preferred embodiment, the apparatus has a disc shaped deck surface supported by perpendicular, interlocking rocking members. The outer ends of the rocking members act to stop the rocking motion of the apparatus, preventing contact between the deck and the hard, flat surface upon which the apparatus rests. Additionally, a plurality of stopping means are secured to the underside of deck between the interlocking members. The stopping means also act to prevent contact between the deck and the hard, flat surface between the rocking members. The stopping means prevent incidental injury to the paws and tails of puppies frolicking upon the apparatus.

The third critical stage occurs during the fifth through seventh weeks. By the end of this stage, a puppy's nervous system and trainability have completely developed. As each puppy becomes more independent, playful romps, exploration, and ventures away from the security of the mother become frequent. These activities develop a puppy's personality, physical conditioning, and confidence.

Normally, the litter will be confined to a stall, box or run. Unfortunately, the restrictive environment of a stall or run restricts each puppy's ability to experience environmental stimuli such as climbing, rocking, pitching, and noise. Such an environment detracts from the development of the character, confidence, agility, balance and coordination of each puppy in the litter. By placing and employing the present apparatus and method within the litter's environment, each puppy can climb upon the apparatus and rockingly play king-of-the-hill type games with his litter mates. Such activity sharpens and develops a puppy's conditioning, agility, balance and coordination. Exposure to the apparatus enables each puppy to teach itself to learn as he creatively seeks new approaches to maintain his position atop the apparatus.

The fourth critical stage runs from the eighth through twelfth weeks. This stage may be considered to be analogous to the kindergarten stage of human child development. At this stage, a good trainer attempts to teach each puppy how to learn. What a puppy learns will be retained and become a part of the puppy's personality and characteristic of the overall dog. Behavioral training also begins with short game-like intervals teaching the commands: "Sit", "Stay", "Come" and "No".

A puppy learns by association, whether the association is provided by the trainer or the environment. If a puppy is properly taught to learn, formal schooling will be very successful. Each puppy will learn more easily and rapidly, allowing the trainer to produce highly skilled dogs in a minimal amount of time.

The present apparatus and method teaches and develops each puppy within a litter by providing environmental stimuli. The method and apparatus help to develop a sense of security in each puppy by teaching them not to fear unfamiliar motions and sound. Balancing skill is improved by the unpredictable rocking motion of the apparatus. Agility is improved as each puppy attempts to gain control of the apparatus while playing with other puppies. Disposition is improved by providing the litter with a more stimulating environment in which to develop. Each puppy is also conditioned to be insensitive to loud unfamiliar noises produced by the rocking motion of the apparatus against the hard surface and by the yelps, barks and growls of the litter. Lastly, the apparatus, by visual association, enables a trainer to efficiently distinguish those puppies displaying superior mental and physical characteristics suitable for specialized training.

At the beginning of the Fifth Critical Stage (the thirteenth through sixteenth weeks) each puppy is fully developed mentally, lacking only experience. At this stage formal obedience training normally begins. Typically, each puppy has physically outgrown the apparatus. However, the exercises used to teach a dog in Police, Seeing Eye or Security and obedience training utilize many of the same skills developed by the apparatus in the earlier critical stages.

Specialized training of puppies for police work, security, obedience or as aids to the handicapped requires a well balanced disposition as well as high intelligence and physical abilities. Such training includes teaching and developing climbing, jumping, agility, balance and overall coordination skills. The present method and apparatus promotes such training. As noted above, placing the apparatus into a puppy's environment just prior to the third critical stage assists a trainer in producing highly qualified, well adjusted, intelligent puppies which are readily trainable in a minimal amount of time.

BEST MODE FOR PRACTICING THE INVENTION

The present invention provides a new apparatus and method for improving the general character, ability and trainability of a young dog between the ages of three (3) to twelve (12) weeks.

Figure 1:
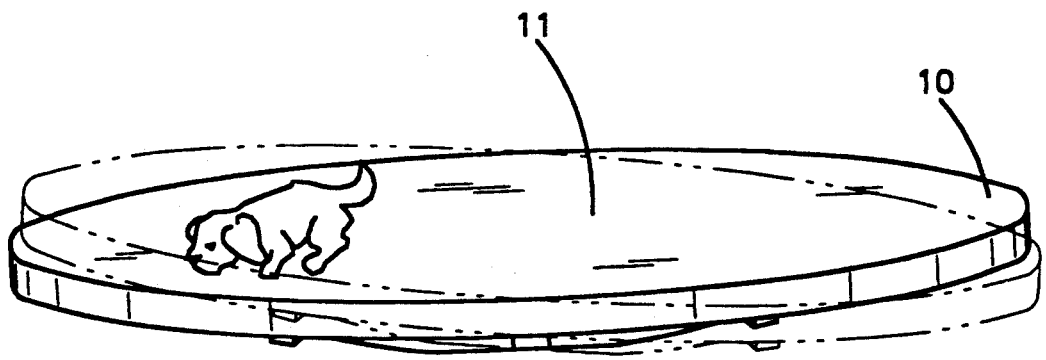
FIG. 1 is a perspective view looking down on a preferred embodiment of the apparatus wherein a deck is supported by interlocking rocking members so that a puppy climbing upon the deck can rock the apparatus about an axis defined by the interlocking rocking members.
Figure 2:
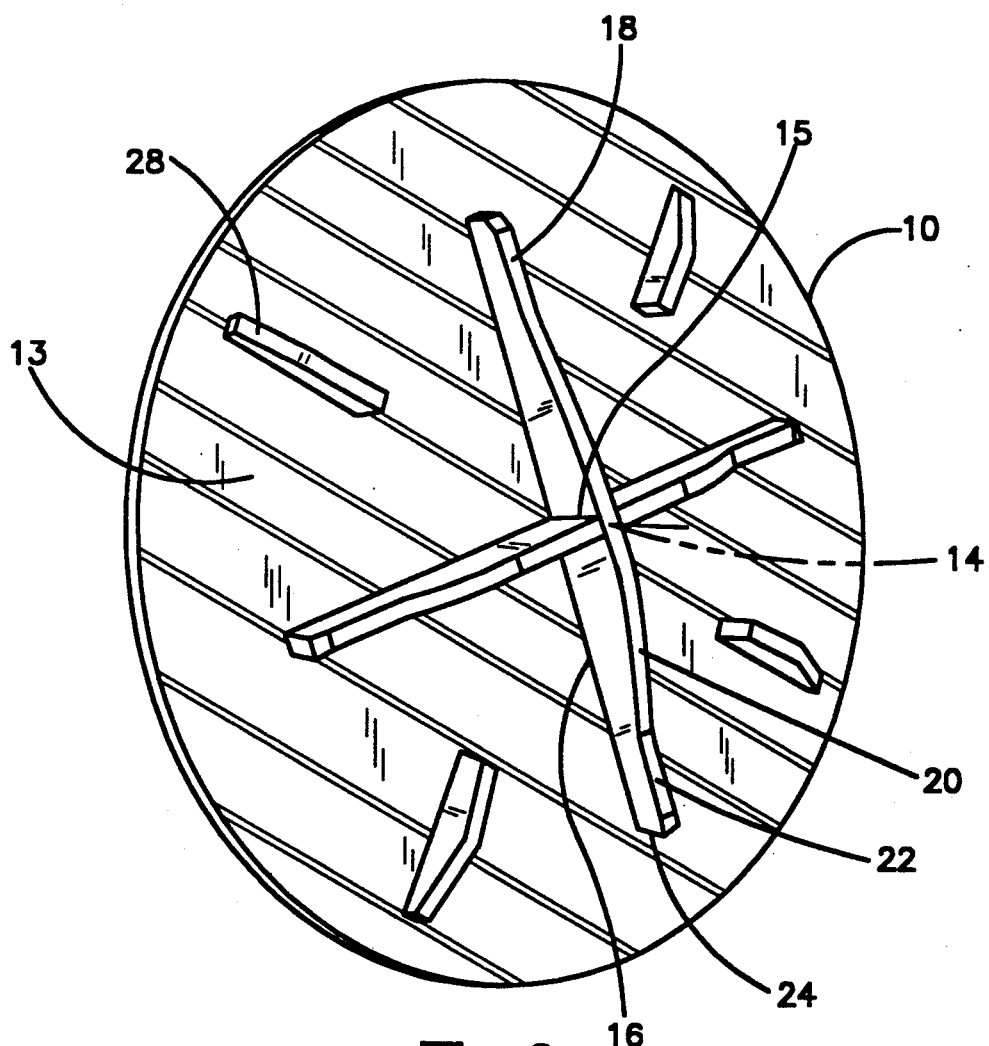
FIG. 2 is a perspective view looking up toward the bottom of a preferred embodiment of the apparatus showing perpendicular interlocking rocking members and selectively placed stops.
Figure 3:
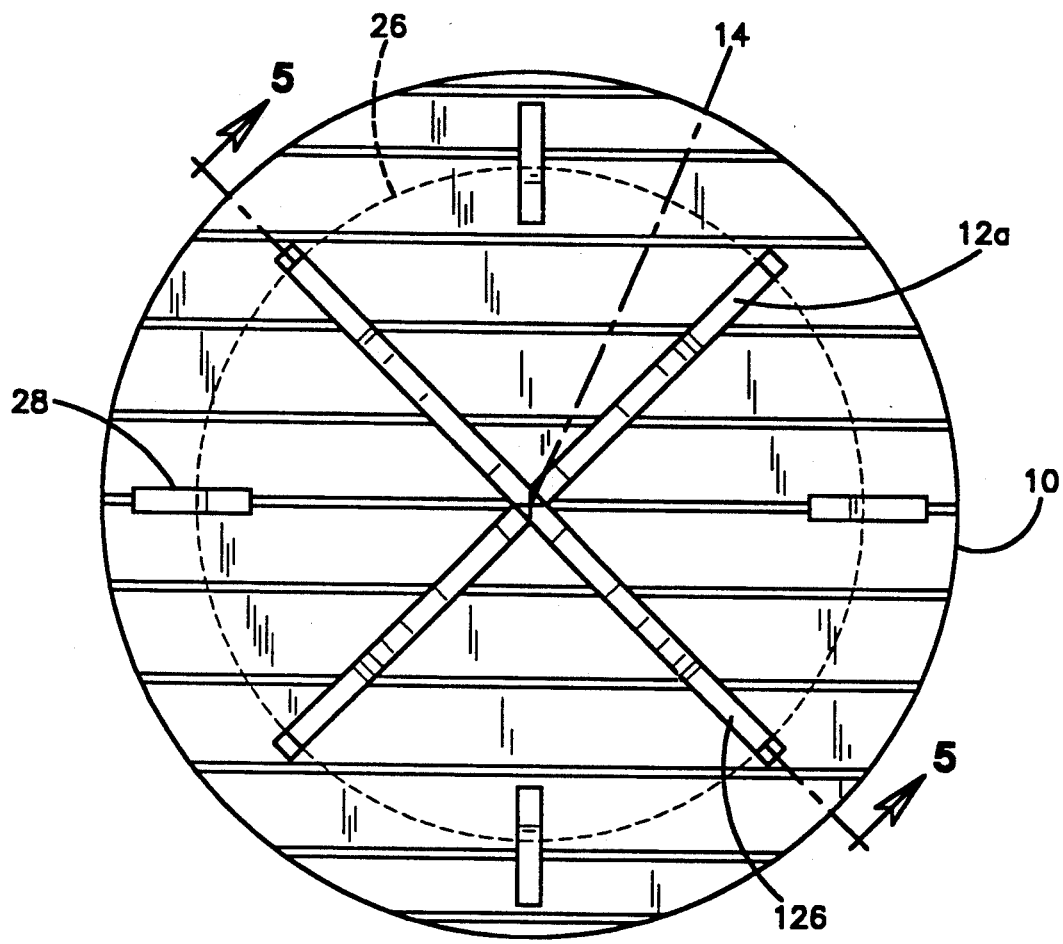
FIG. 3 is a bottom view of a preferred embodiment of the apparatus depicting the location and relationship of the rocking members and stops.
Figure 4:
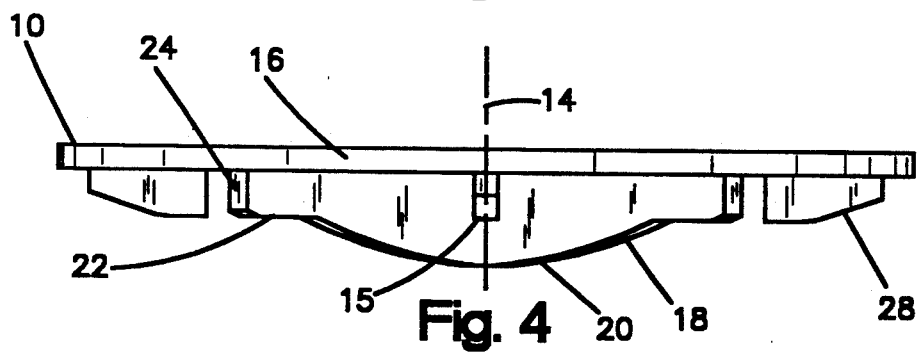
FIG. 4 is a side elevational view of a preferred embodiment of the apparatus showing interlocking, perpendicular rocking members attached to a deck, with stops selectively attached to the deck.
Figure 5:
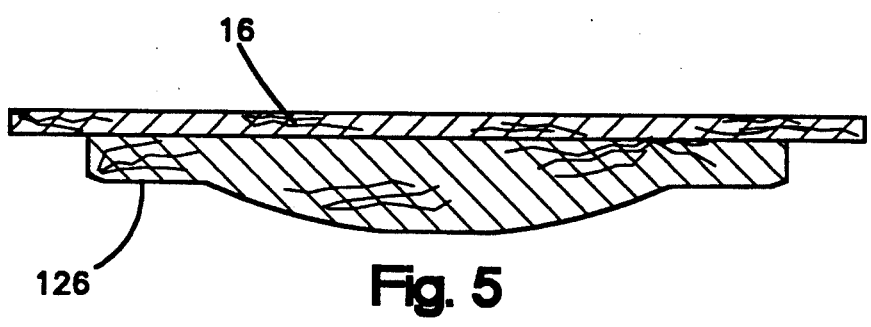
FIG. 5 is a sectional view of the apparatus of FIG. 3, as seen from the plane indicated by the line 5—5 in FIG. 3.

Referring now to FIGS. 1 through 5, the best mode of the apparatus is disclosed. Present plans contemplate the manufacture of the apparatus utilizing plastic injection or vacuum mold processes.

In one preferred embodiment a circular deck 10 of predefined diameter is provided. The deck is securely attached atop a base 12. The base is comprised of pair of rocking members 12a, 12b having a predefined length less than the diameter of the deck. When at rest, the deck 10 is supported with its top surface 11 in a plane parallel to the ground. The distance between the deck top surface 11 and the ground is such that a young puppy or litter of puppies, aged three (3) weeks, can climb upon the deck top surface 11. Once a puppy has succeeded in climbing upon the deck top surface 11, he can playfully romp and play king-of-the hill type games with his litter mates as the deck 10 rocks and rotates.

The rocking members 12a, 12b are attached to the bottom surface 13 of the deck 10 and symmetrically disposed about the central axis 14. Each has a centrally located recess 15 to fittingly, perpendicularly interlock the members 12a, 12b. The members 12a, 12b are secured to the deck 10, so that the intersection of the members 12a, 12b is near the central axis 14 of the disk.

Each rocking member 12a, 12b has a flat upper surface 16 which is attached to the bottom surface 13 of the deck 10. The lower member surface 18 of each member 12a, 12b has a central curved surface 20. Each member also has a lower flat surface 22 and ends 24. Additionally, a plurality of stops 28 are placed between the ends 24 of each rocking member 12a, 12b. The length of the stops 28 equals the height of the lower flat surfaces 22.

In another preferred embodiment, the placement of the stops 28 between the ends of each rocking member 12a, 12b, would be varied to promote a sinusoidal motion of the apparatus. Additionally, attachment of stops 28 of varying lengths, equal to or less than the height of the lower flat surface 22, would also produce the desired sinusoidal motion of the apparatus.

In use, the apparatus is placed within the stall or run where a litter of puppies, between the age of three to twelve weeks, resides. When the puppies climb upon the deck top surface 11, the apparatus rocks and rotates over the central curved surface 20 of the rocking members 12a, 12b, and about the central axis 14. The lower flat surfaces 22 and stops 28 prevent the deck 10 from contacting the hard, flat surface upon which the apparatus is placed. More specifically, the stops 28 and lower flat surfaces 22 halt the movement of the deck 10 so that injury to the paws and tails of the puppies is avoided.

Use of the present method and apparatus will enable dog trainers to produce litters of highly intelligent, able-bodied puppies of good disposition in less time and at a lower cost.

Although the apparatus and method have been described with a certain degree of particularity, it should be understood that those skilled in the art can make various changes without departing from the spirit or scope as hereinafter claimed. Moreover, the features of described embodiment may be incorporated in other embodiments, and the scope of the invention is the full scope of the claims.

I claim:

1. A puppy training device for improving balance, coordination and animal disposition comprising:
   a) a deck having a generally flat upper surface and an opposed bottom surface;
   b) a base connected to the deck and including a plurality of rocking members depending from the bottom surface, each of the rocking members having a convex rocking underside surface spaced from the bottom surface, the convex rocking surfaces being adapted to support the device on a flat surface for professional movement;
   c) each member extending generally radially from a central axis to ends spaced inwardly from the perimeter of the deck thereby allowing rocking of the members about the central axis and precessional rotation of the device around the axis; and,
   d) stopping means depending from the deck bottom surface, the stopping means including a plurality of circumferentially spaced stop elements, each having a base surface spaced from the bottom surface, the stop elements and the rocking members each being spaced inwardly from the perimeter of the deck and from the bottom surface sufficiently to restrict the range of precessional motion of the device when in use to maintain the perimeter of the bottom surface in spaced relationship with a device supporting surface and prevent substantial injury to a puppy's paws and tail by pinching between such device supporting surface and any one of the perimeter of the bottom surface, the stop element base surfaces and the rocking members.

2. The device of claim 1 wherein the deck is comprised of:
a disc-like platform of sufficient size to allow a puppy dog between the age of 3 to 12 weeks to frolic and romp about the platform.

3. The device in claim 1 wherein the stopping means comprise a plurality of studs symmetrically disposed about the bottom side of the deck and having a length greater than or equal to the height of the base members, whereby the movement of the deck relative to such a device supporting surface upon which the device is supported is restricted.

4. A supply training device for improving balance, coordination and animal disposition comprising:
a) a deck having a generally flat upper surface and an opposed bottom surface;
b) a base connected to the deck and including a plurality of rocking members depending from the bottom surface, each of the rocking members having a convex rocking underside surface spaced from the bottom surface, the convex rocking surfaces being adapted to support the device on a flat surface for precessional movement;
c) each member extending generally radially from a central axis to ends spaced inwardly from the perimeter of the deck thereby allowing rocking of the members about the central axis and precessional rotation of the device around the axis; and,
d) stopping means depending from the deck bottom surface, the stopping means including a plurality of circumferentially spaced, radially disposed, stop elements, each having a base surface spaced from the bottom surface, the base surface having sections in at least two planes, the stop elements and the rocking members being spaced inwardly from the perimeter of the deck to restrict the range of precessional motion of the device when in use to prevent injury to a puppy's paws and tail by pinching between a device supporting surface and any one of the perimeter of the bottom surface, the stop elements and the rocking members.

5. The device of claim 4 wherein the deck is comprised of:
a disc-like platform of sufficient size to allow a puppy dog between the age of 3 to 12 weeks to frolic and romp about the platform.

6. The device of claim 4 wherein the stopping means comprise a plurality of studs symmetrically disposed about the bottom side of the deck and having a length greater than or equal to the height of the base members, whereby the movement of the deck relative to a surface upon which the device is supported is restricted.

7. A method of training puppies to enhance their balance and temperament comprising:
a) positioning orthogonally disposed rocking supports of a training device on a support surface for precessional movement of the device on the support surface which is sufficiently flat that circumferentially spaced stops maintain a perimeter of a platform of the device in spaced relationship with the support surface throughout a range of rocking, precessional movement of the device while on the support surface, the spaced relationship being sufficiently great that each puppy that is to play on and around the device will not suffer injury by pinching of its tail or paws between the support surface and any of the supports, the stops and the perimeter;
b) thereafter placing at least one puppy on or near the device;
c) allowing said at least one puppy to play on the device; and,
d) observing said at least one puppy playing on the device.

* * * * *